US008841863B2

(12) United States Patent
Ido

(10) Patent No.: US 8,841,863 B2
(45) Date of Patent: Sep. 23, 2014

(54) LIGHTING APPARATUS, BACKLIGHT APPARATUS

(75) Inventor: Shigeru Ido, Osaka (JP)

(73) Assignee: Panasonic Corporation, Osaka (JP)

( * ) Notice: Subject to any disclaimer, the term of this patent is extended or adjusted under 35 U.S.C. 154(b) by 882 days.

(21) Appl. No.: 12/999,109

(22) PCT Filed: Jul. 14, 2009

(86) PCT No.: PCT/JP2009/062733
§ 371 (c)(1),
(2), (4) Date: Dec. 15, 2010

(87) PCT Pub. No.: WO2010/007985
PCT Pub. Date: Jan. 21, 2010

(65) Prior Publication Data
US 2011/0089846 A1    Apr. 21, 2011

(30) Foreign Application Priority Data

Jul. 14, 2008  (JP) .................................. 2008-182897

(51) Int. Cl.
G05F 1/00 (2006.01)
H05B 33/08 (2006.01)
H05B 41/282 (2006.01)

(52) U.S. Cl.
CPC ........... *H05B 41/2828* (2013.01); *Y02B 20/346* (2013.01); *H05B 33/0818* (2013.01); *H05B 33/086* (2013.01); *Y10S 315/04* (2013.01)
USPC ....... 315/307; 315/308; 315/291; 315/DIG. 4

(58) Field of Classification Search
USPC ............. 315/119, 127, 200 R, 225, 247, 287, 315/291, 297, 307, 308, 361, 362, DIG. 4
See application file for complete search history.

(56) References Cited

U.S. PATENT DOCUMENTS

| 5,278,490 A | 1/1994 | Smedley |
| 6,424,101 B1 | 7/2002 | Sabate |

(Continued)

FOREIGN PATENT DOCUMENTS

| CN | 1397150 | 2/2003 |
| CN | 1991961 | 7/2007 |

(Continued)

OTHER PUBLICATIONS

First Office Action, dated Jan. 4, 2013 (together with English language translation thereof), from the State Intellectual Property Office (SIPO) of People's Republic of China.

(Continued)

*Primary Examiner* — Douglas W Owens
*Assistant Examiner* — Jianzi Chen
(74) *Attorney, Agent, or Firm* — Greenblum & Bernstein, P.L.C.

(57) ABSTRACT

A lighting apparatus includes: a lighting circuit; a dimming signal circuit; and a feedforward control circuit. The lighting circuit receives an output which is rectified and smoothed commercial power, and supplies power to a light source Lamp. The dimming signal circuit sends a timing signal to the lighting circuit, wherein the timing signal is a signal for switching an output of the lighting circuit periodically to an ON state and either of an OFF state and a dimmed state. The feedforward control circuit detects either of an input voltage of the lighting circuit and an input voltage of the smoothing circuit, and sends a control signal to the dimming signal circuit, wherein the control signal is a signal for correcting a lighting time so that a light output of the light source can become a desired value.

11 Claims, 8 Drawing Sheets

(56) References Cited

U.S. PATENT DOCUMENTS

| | | |
|---|---|---|
| 6,963,176 B2 | 11/2005 | Onishi et al. |
| 7,804,480 B2 | 9/2010 | Jeon et al. |
| 2002/0067139 A1 | 6/2002 | Sabate |
| 2007/0146565 A1 | 6/2007 | Jeon et al. |

FOREIGN PATENT DOCUMENTS

| | | |
|---|---|---|
| JP | 64-44600 | 3/1989 |
| JP | 7-272889 | 10/1995 |
| JP | 11-202286 | 7/1999 |
| JP | 2002-330591 | 11/2002 |
| JP | 2005-142137 | 6/2005 |
| JP | 2007-178985 | 7/2007 |
| JP | 2007-529872 | 10/2007 |
| WO | 02/47442 | 6/2002 |
| WO | 2005/089309 | 9/2005 |

OTHER PUBLICATIONS

U.S. Appl. No. 12/677,908 to Kazuhiro Kumada et al., which was filed on Mar. 12, 2010.

LIGHTING APPARATUS, BACKLIGHT APPARATUS

TECHNICAL FIELD

The present invention relates to a lighting apparatus for use in a backlight apparatus of a liquid crystal display apparatus, and the like, and particularly, relates to reduction of light flickering and improvement of circuit efficiency.

BACKGROUND ART

In general, a liquid crystal display apparatus displays images by light from a backlight apparatus which has a plurality of fluorescent lamps such as cold cathode tube lamps. An inverter circuit is generally used in a lighting circuit. Light emission efficiency of the lamps is enhanced by lighting the lamps at a high frequency, thus making it possible to miniaturize electric components such as a transformer.

The liquid crystal display apparatus has been required to have higher efficiency as they become increasingly popular. In particular, the backlight apparatus consumes a major part of power for the liquid crystal display apparatus, and accordingly enhancement of the efficiency thereof is important. In this regard, it is proposed to reduce a switching loss of the inverter circuit by adopting a soft switching method such as zero voltage switching for a discharge lamp lighting circuit. It is also proposed to reduce a loss of a step-up transformer by using a direct current power supply of a high voltage specification to output to the inverter circuit.

As light sources of the liquid crystal display apparatus, not only the fluorescent lamps but also LEDs as semiconductors which emit light, organic ELs, and the like are being put into practical use. Hence, the efficiency enhancement is also required for the lighting circuit that supplies power to these light emitting devices.

However, efficiency of power conversion in the lighting circuit for these backlight apparatuses is lower than that of a lighting circuit for general illumination. This is because a direct current stabilizer circuit is separately required for suppressing flickering as compared with the lighting circuit for the general illumination.

Here, it is shown why the flickering is not regarded as a problem in the lighting circuit for the general illumination. For example, flickering in a fluorescent lamp inverter circuit is considered when a commercial power (50 Hz) is used as a power supply. In the fluorescent lamp inverter circuit, a rectifier circuit rectifies the commercial power, a smoothing circuit smoothes a direct current voltage from the rectifier and supplies direct current power to the inverter circuit, and thereby the inverter circuit supplies high frequency power to each of the lamps. The output voltage of the smoothing circuit contains a so-called ripple voltage. That is, it does not become a complete direct current.

Therefore, an output voltage of the inverter circuit also fluctuates to some extent by the ripple voltage. For example, it is assumed that the direct current voltage inputted to the inverter circuit contains a ripple voltage with 100 Hz. This 100 Hz is a frequency component of the commercial power, and it appears when the commercial power is converted with full-wave rectification. When the inverter circuit lights the lamp without removing this ripple voltage, fluctuations having the frequency component of 100 Hz occur in a light output. In the inverter circuit for the general illumination, a level of the ripple voltage is approximately 10% or less. Even if one directly seen this light, the one hardly sensed flickering therein. This is because such a frequency of the light fluctuation is as high as 100 Hz. Therefore, this flickering is not particularly regarded as a problem in the inverter circuit of the fluorescent lamp, which is used in the general illumination and the like.

However, in the liquid crystal display apparatus, a lighting method is different from that for the general illumination, and accordingly, the flickering becomes significant. This is because the general backlight apparatus of the liquid crystal display apparatus performs impulse lighting at a relatively low frequency.

Patent Literature 1 (Japanese Patent Laid-Open Publication No. H07-272889), a period of applying a high frequency voltage to the fluorescent lamp and a period of not applying the high frequency voltage thereto are periodically repeated, whereby dimming of the fluorescent lamp is performed. In this dimming, the light output is determined from a time ratio between such a lighting period and such a shut-off period. Hence, the light output is linearly changed in comparison with a method of continuously varying a lamp current. Moreover, blinks of the fluorescent lamp improves a blur of a moving picture on the liquid crystal display apparatus.

Patent Literature 2 (Japanese Patent Laid-Open Publication No. H11-202286) discloses a technique for obtaining a clear image by impulse light emission of a light source in the liquid crystal display apparatus. This technique allows the light source to emit light in matching with an update cycle of an image, and thereby improves responsiveness of the liquid crystal display apparatus, of which slowness is a disadvantage. Specifically, when updating a display image at 60 Hz, the light source just performs the impulse light emission at 60 Hz. As described above, the impulse light emission of the light source is useful for the liquid crystal display apparatus.

However, this impulse light emission requires a stable power supply. This is because, when the power supply of the light source contains the ripple voltage of the commercial power, fluctuations occur owing to interference between a frequency of the ripple voltage and a frequency of the impulse light emission. For example, it is assumed that the frequency of the commercial power is 50 Hz, and that a ripple voltage with 100 Hz is generated in the output of the smoothing circuit. If the frequency of the impulse light emission is assumed to be 120 Hz at this time, light fluctuations of 20 Hz occur. Specifically, when a difference between the frequency of the commercial power and the frequency of the impulse light emission becomes a low frequency, then such a difference appears as the flickering.

As countermeasures against this flickering, there is a method of setting the frequency of the impulse emission away from the ripple frequency. Specifically, setting is made so as to increase the difference between the frequency of the commercial power and the frequency of the impulse light emission. When the ripple frequency and the frequency of the impulse light emission is set at 100 Hz and 380 Hz, respectively, the difference between both of the frequencies becomes 280 Hz, and thereby the flickering becomes inconspicuous.

However, in order to efficiently obtain such a clear image as in Patent Literature 2, it is necessary to synchronize a cycle of the impulse light emission with the update cycle of the display image. Specifically, when a liquid crystal display updates images at 60 Hz, the frequency of the impulse light emission can be selected from among 60 Hz, 120 Hz and 180 Hz. In this case, a frequency as low as possible must be selected in order to obtain the clearest image with the brightest screen.

In this connection, a general liquid crystal display apparatus includes a regulated power supply circuit that removes the ripple voltage of the direct current power, which is caused by the commercial power. If there is no influence by the ripple, then the problem of the flickering caused by the ripple does not occur. However, regulating the power supply increases a circuit loss. Accordingly, efficiency of conversion from the power to the light in the liquid crystal display apparatus decreases.

Incidentally, as a method of reducing the influence of the ripple without using the regulated power supply circuit, it is conceived to add a function to remove the power supply ripple to the inverter circuit. For example, the lamp current is used in feedback control. If the feedback control is performed, the lamp current becomes substantially constant, and the fluctuations of the light output by the ripple voltage can be removed.

However, in this feedback control, it is necessary to detect the lamp current by an isolated secondary side circuit, and to transmit a detection signal thus obtained to a non-isolated primary side switching circuit. Hence, it is actually difficult to design the feedback control for objects including a transmission circuit concerned.

As another method, it is conceived to perform feedforward control. In this control, an inverter output is increased and reduced in response to the ripple voltage. This enables to configure a control circuit at the non-isolated primary side, and thus it becomes easy to design an isolation circuit. Further, since the ripple voltage is generated relatively stably, and it is suitable for the feedforward control. In this regards, various methods for this feedforward control for the discharge lamp lighting apparatus are proposed.

Patent Literature 3 (Japanese Patent Laid-Open Publication No. 2002-330591) proposes a technique for suppression of the change of the lamp current owing to the voltage fluctuations. This technique detects an input voltage of the inverter, and changes a drive frequency of a switch or a time ratio between switching on and switching off so as to perform the suppression as described above.

Moreover, Patent Literature 4 (Japanese Unexamined Patent Publication No. 2007-529872) proposes a technique for the feedforward control. This technique accumulates energy in an inductor and the like and performs the feedforward control so that energy accumulated in a converter giving energy to the light source can be constant.

CITATION LIST

Patent Literatures

Patent Literature 1: Japanese Patent Laid-Open Publication No. H07-272889
Patent Literature 2: Japanese Patent Laid-Open Publication No. H11-202286
Patent Literature 3: Japanese Patent Laid-Open Publication No. 2002-330591
Patent Literature 4: Japanese Unexamined Patent Publication No. 2007-529872

SUMMARY OF INVENTION

Patent Literature 3 discloses the technique which is suitable for continuous lighting. However, in dimming that repeats the blink, such as lighting control (burst dimming control) for use in the liquid crystal display apparatus, particularly in the case of blinking the fluorescent lamp and the like, there is a problem that the flickering occurs owing to a shift in start timing of the lamp, and the like.

In Patent Literature 4, the energy for light emitting elements such as LEDs is once accumulated in the inductor and the like, and thereafter, the light emitting elements are allowed to emit light. Hence, an energy loss for this accumulation is involved. Moreover, it is necessary to raise a switching frequency in order to miniaturize an element for the energy accumulation, and therefore, the switching loss tends to be also increased.

The present invention has been made in order to solve the problems as described above, which are inherent in the conventional technology. It is an object of the present invention to provide an inexpensive and highly efficient lighting apparatus without damaging image display performance of the liquid crystal display apparatus in such a manner that control to remove the flickering caused by the power fluctuations is surely performed in the inverter circuit that lights the light source of the liquid crystal display apparatus.

An aspect of the present invention is a lighting apparatus comprising: a rectifier configured to rectify a commercial power; at least one smoothing circuit configured to smooth an output of the rectifier; a lighting circuit configured to receive an output of the smoothing circuit and configured to supply power to a light source; a dimming signal circuit configured to send a timing signal to the lighting circuit, the timing signal being for switching an output of the lighting circuit periodically to an ON state and either of an OFF state and a dimmed state; and a feedforward control circuit configured to detect either of an input voltage of the lighting circuit and an input voltage of the smoothing circuit, and configured to send a control signal to the dimming signal circuit, the control signal being for correcting a lighting time so that a light output of the light source can become a desired value.

The lighting circuit may include a control circuit that makes an input current inputted thereto constant.

It is preferable that the feedforward control circuit start to integrate a voltage signal proportional to either of the input voltage of the lighting circuit and an input voltage of the smoothing circuit simultaneously when the output of the lighting circuit is turned on. Moreover, it is preferable that, when an integration value of the voltage signal becomes a predetermined value, the feedforward control circuit sends a signal for turning off the lighting circuit to the dimming signal circuit.

It is preferable that the feedforward control circuit starts to integrate a multiplied value of an input voltage signal and input current signal of the lighting circuit simultaneously when the output of the lighting circuit is turned on. Moreover, it is preferable that, when a value obtained by integrating the multiplied value becomes a predetermined value, the feedforward control circuit sends a signal for turning off the lighting circuit to the dimming signal circuit.

It is preferable that the dimming signal circuit sets an ON state period of the lighting circuit to a period having a time ration less than 100%.

A frequency of the dimming signal circuit may be 30 Hz to 1000 Hz.

The light source may be a semiconductor light source.

An aspect of the present invention may be a backlight apparatus including the above-described lighting apparatus.

In accordance with the present invention, the feedforward control for adjusting the lighting time is executed so that an emitting light quantity of the light source has a desired value. Since the light quantity can be corrected by varying the time ratio between the lighting period and the shut-off period, high-speed feedback control and the like is not required. Hence, the flickering owing to the ripple of power can be suppressed by means of an inexpensive configuration.

DESCRIPTION OF EMBODIMENTS

A description is made below of embodiments of the present invention with reference to the drawings.

First Embodiment

Figure 1:
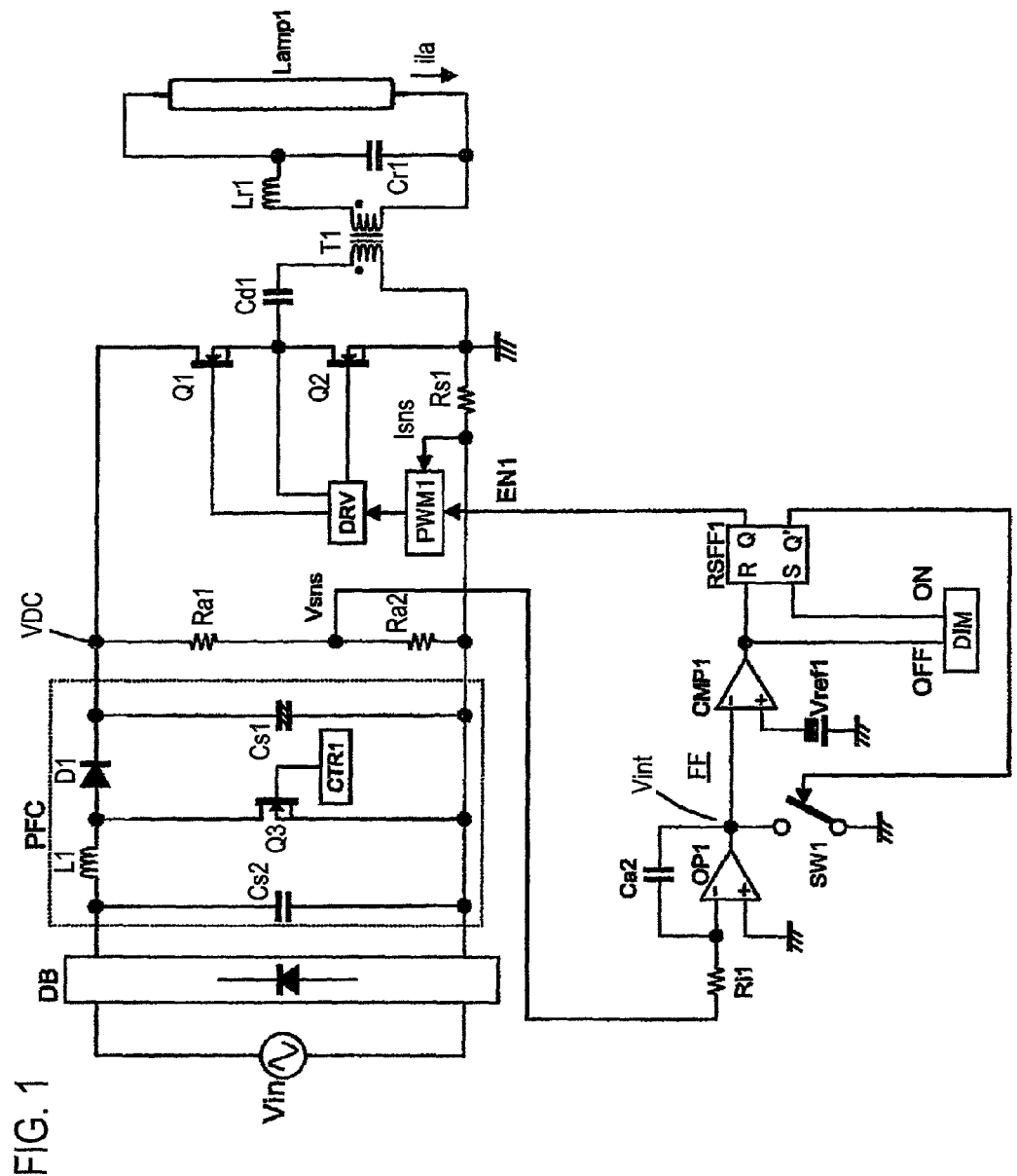
FIG. 1 is a circuit diagram of a first embodiment according to the present invention.

As shown in FIG. 1, a lighting circuit according to a first embodiment of the present invention includes: a rectifier circuit DB that rectifies a commercial power Vin; and a power factor improvement circuit PFC that steps up and smoothes an output of the rectifier circuit DB.

The power factor improvement circuit PFC is a well-known step-up chopper circuit. The power factor improvement circuit PFC includes: a capacitor Cs2; a series circuit of an inductor L1 and a switching element Q3; a electrolytic capacitor Cs1; and a chopper control unit CTR1. The capacitor Cs2 is connected in parallel to rectified current output terminals of the rectifier circuit DB. The capacitor Cs2 has a relatively small capacity. The series circuit of an inductor L1 and a switching element Q3 is connected to the rectified current output terminals of the rectifier circuit DB. The electrolytic capacitor Cs1 is for smoothing and is connected in parallel to both ends of the switching element Q3 through a diode D1. The chopper control unit CTR1 performs ON/OFF control for the switching element Q3 at a high frequency. In the power factor improvement circuit PFC, the switching element Q3 is turned on/off at a frequency higher than a commercial frequency, whereby an idle period of an input current from the commercial power Vin is reduced, and an input power factor is improved. The smoothing electrolytic capacitor Cs1 is charged with a stepped-up direct current voltage. When the commercial power Vin reaches a value at a valley thereof, energy charged to the capacitor Cs1 becomes insufficient. Accordingly, onto an output voltage VDC of the power factor improvement circuit PFC, a ripple voltage with a frequency component twice that of the commercial power Vin is superimposed. For example, when an input voltage of the commercial power Vin and a frequency thereof are 100V and 50 Hz, respectively, a ripple voltage with 100 Hz is superimposed on the output voltage VDC. Other operations of the power factor improvement circuit PFC are well known, and accordingly, a detailed description thereof is omitted.

The output voltage VDC of the power factor improvement circuit PFC is supplied to a half bridge inverter circuit (hereinafter, simply referred to as an inverter circuit) The inverter circuit has: a series circuit of switching elements Q1 and Q2; a drive circuit DRV therefor; a capacitor Cd1 and an isolation transformer T1; and a resonant inductor Lr1 and a resonant capacitor Cr1. A resistor Rs1 is inserted to an input terminal of the inverter circuit at a low voltage-side. The inverter circuit converts the direct current voltage VDC into a high frequency voltage, and supplies power to a fluorescent lamp Lamp1.

The switching elements Q1 and Q2 are composed, for example, of MOSFETs, each of which incorporates therein a backward diode connected in parallel between a source and drain thereof. The switching elements Q1 and Q2 are alternately turned on/off at a high frequency. When the switching element Q1 is on, and the switching element Q2 is off, a current flows through a route of: a positive electrode of the direct current power VDC; the switching element Q1; the capacitor Cd1; a primary winding of the isolation transformer T1; the current detection resistor Rs1; and a negative electrode of the direct current voltage VDC. In such a way, the capacitor Cd1 is charged. When the switching element Q1 is off, and the switching element Q2 is on, the current flows through a route of: the capacitor Cd1; the switching element Q2; the primary winding of the transformer T1; and the capacitor Cd1. In such a way, the capacitor Cd1 is discharged. Hence, the isolation transformer T1 is excited by the high frequency voltage, and a stepped-up high frequency voltage is generated in a secondary winding thereof. This stepped-up high frequency voltage is applied to a series resonant circuit of the resonant inductor Lr1 and the resonant capacitor Cr1, and is further stepped up by resonance thereof. Moreover, a high voltage with a high frequency is generated between both ends of the resonant capacitor Cr1, and this high voltage is applied to both ends of such a discharge lamp Lamp1. Here, the discharge lamp Lamp 1 is a cold cathode fluorescent lamp (CCFL), a hot cathode fluorescent lamp (HCFL) or the like.

An oscillation frequency of the switching elements Q1 and Q2 is usually set at a frequency higher than a resonant frequency. When this oscillation frequency is increased, a light output of the discharge lamp Lamp1 is decreased. Meanwhile, when the oscillation frequency is decreased, the light output of the discharge lamp Lamp1 is increased. In this embodiment, there are provided: a lighting period while the switching elements Q1 and Q2 are being alternately turned on/off at the high frequency; and a shut-off period while both of the switching elements Q1 and Q2 are off. The discharge lamp Lamp1 is lighted in a blinking fashion in such a manner that the lighting period and the shut-off period are alternately switched. Moreover, the lighting period and the shut-off period are repeated at a low frequency (for example, 120 Hz) synchronized with a video update cycle of a liquid crystal display apparatus. Note that, even during the shut-off period, the switching elements Q1 and Q2 may be alternately turned on/off at a frequency sufficiently higher than the resonant frequency. In this case, such an ON/OFF operation frequency is switched to a frequency so high as not to make it possible to maintain the lighting of the discharge lamp Lamp1.

The inverter circuit includes a pulse width modulation controller PWM1. A feedback control circuit is added to the inverter circuit. In this feedback control, a detection signal from the resistor Rs1 is received, whereby an ON time and operation frequency of each of the switching elements Q1 and Q2 is adjusted so that the input current to the inverter circuit can become a predetermined value. Moreover, this feedback control functions only during the lighting period while an enable signal EN1 becomes High, and during the shut-off period while the enable signal EN1 becomes Low, the oscillation itself of the inverter circuit is stopped.

Upon receiving a high frequency output from the pulse width modulation controller PWM1, the drive circuit DRV applies pulse voltages with a high frequency to a gate electrode of the switching element Q2 and between gate/source electrodes of the switching element Q1. Note that phases of such high frequency voltages are reverse to each other. Hence, by the application of these high frequency pulses, the switching element Q2 is turned on/off at the high frequency, and on the contrary, the switching element Q1 is turned off/on at the high frequency. Note that, in this embodiment, the ON time of each of the switching elements Q1 and Q2 is set equal to that of other. Moreover, when the feedback control is control for the ON time, the oscillation frequency is constant, and the ON time of each of the switching elements Q1 and Q2 is increased and reduced. When the feedback control is control for the oscillation frequency, the operation frequency at which the switching elements Q1 and Q2 are alternately turned on is changed.

The above-described operations are summarized below. When the enable signal EN1 is Low, both of the switching elements Q1 and Q2 are off, and the oscillation of the inverter circuit is stopped, and accordingly, the discharge lamp Lamp1 is shut off. When the enable signal EN1 is High, the switching elements Q1 and Q2 are alternately turned on at the high frequency, whereby the inverter circuit oscillates, and the discharge lamp Lamp1 is lighted by an oscillation output generated thereby. The input current to the inverter circuit is detected by the resistor Rs1. When the input current is smaller than a default value, the ON time of each of the switching elements Q1 and Q2 is extended, or the operation frequency thereof is lowered, whereby the output is increased. When the input current is larger than the default value, the ON time of each of the switching elements Q1 and Q2 is shortened, or the operation frequency thereof is raised, whereby the output is reduced. By increasing or reducing the output in such a way, the input current becomes constant. The lighting period while the enable signal EN1 is High and the shut-off period while the enable signal EN1 is Low are repeated at the low frequency (for example, 120 Hz) synchronized with the video update cycle of the liquid crystal display apparatus. The light output is adjusted by varying a time ratio between the lighting period and the shut-off period.

The enable signal EN1 is outputted from a feedforward control circuit FF. The feedforward control circuit FF includes: resistors Ra1, Ra2 and Ri1; an integration capacitor Ca2; a reset switch SW1 for the integration capacitor Ca2; an operational amplifier OP1; a comparator CMP1; and a reference voltage Vref1. The resistors Ra1 and Ra2 output a divided voltage signal Vsns of the voltage VDC. This divided voltage signal Vsns may be used as a signal for the output voltage control by the power factor improvement circuit PFC (that is, an input voltage to the chopper control circuit CTR1). The divided voltage signal Vsns is inputted through the resistor Ri1 to an integration circuit composed of the operational amplifier OP1 and the capacitor Ca2.

An output Vint of the integration circuit is inputted to a negative input terminal of the comparator CMP1. The reference voltage Vref1 is inputted to a positive input terminal of the comparator CMP1. An output of the comparator CMP1 is inputted to a reset input R of a flip-flop circuit RSFF1. To a set input S of the flip-flop circuit RSFF1, an ON pulse signal of a dimming signal generator DIM is inputted.

An inversion output Q' of the flip-flop circuit RSFF1 is outputted to the reset switch SW1. The enable signal EN1 as a non-inversion output Q of the flip-flop circuit RSFF1 is outputted to the pulse width modulation controller PWM1. The pulse width modulation controller PWM1 turns on/off a switching operation of the inverter circuit based on the enable signal EN1.

Here, a description is made of the integration circuit. This integration circuit integrates the voltage Vsns obtained by dividing, by the resistors Ra1 and Ra2, the output voltage VDC of the power factor improvement circuit PFC, and then outputs an integration voltage Vint concerned. An integration time constant is determined by the input resistor Ri1 and a capacity of the capacitor Ca2, which is a feedback impedance. The operational amplifier OP1 is a differential amplifier in which an input impedance and an amplification factor are extremely high. A plus-side input terminal of the operational amplifier OP1 and a minus-side input terminal thereof are in a state of the same potential, that is, in a state of an imaginary short circuit. The plus-side input terminal of the operational amplifier OP1 is connected to a ground potential, and accordingly, a potential of the minus-side input terminal thereof is fixed to the ground potential. The switch SW1 resets the integration capacitor Ca2. When the switch SW1 is ON, both end potentials of the capacitor Ca2 become the ground potential. Therefore, a residual charge of the capacitor Ca2 becomes zero, and the integration voltage Vint becomes zero volt. When the switch SW1 is turned off in order to start the integration, a current flows through the capacitor Ca2 via the resistor Ri1 by the voltage Vsns obtained by dividing, by the resistors Ra1 and Ra2, the output voltage VDC of the power factor improvement circuit PFC, and the capacitor Ca2 is charged. Since the input impedance of the operational amplifier OP1 is extremely high, the current flowing through the resistor Ri1 flows only through the capacitor Ca2. Such a charging current at this time becomes a constant current determined by: (both-end voltage Vsns of resistor Ri1)/(resistance value of resistor Ri1). Accordingly, the integration voltage Vint is linearly lowered. Note that each of the operational amplifier OP1 and the comparator CMP1 is composed of an op-amp using two power supplies which are positive and negative. Hence, in the comparator CMP1, when the integration voltage Vint falls down below the reference voltage Vref1 in a range of a negative potential lower than the ground potential, the output of the comparator CMP1 becomes High.

Figure 2:
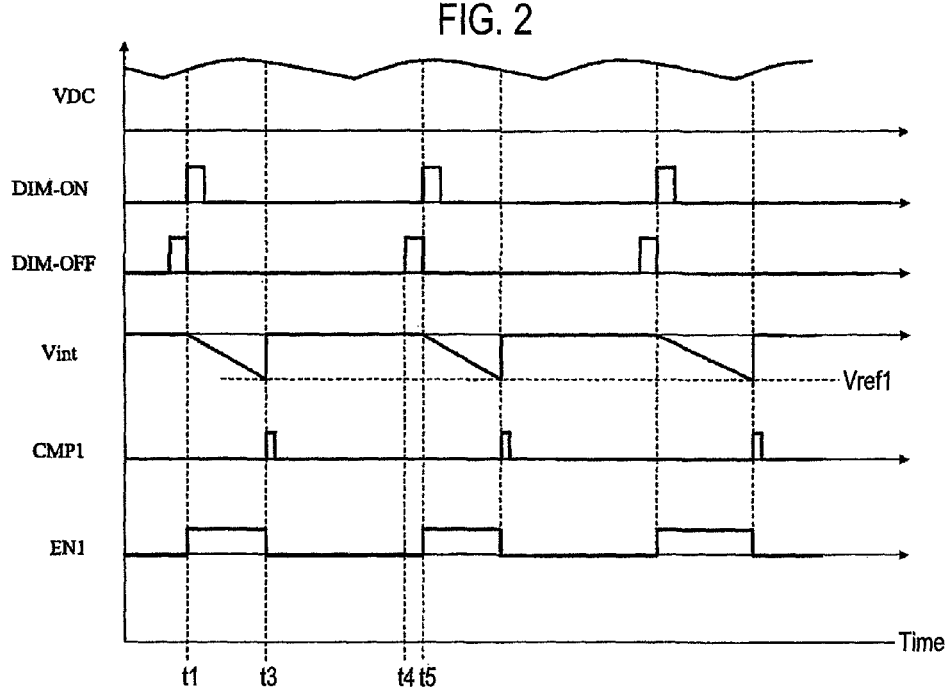
FIG. 2 is an operation waveform chart of the first embodiment.

FIG. 2 shows operation timing of each of the units. FIG. 2 shows from the above: the output voltage VDC of the power factor improvement circuit PFC; the ON pulse signal of the dimming signal generator DIM; an OFF pulse signal of the dimming signal generator DIM; the voltage Vint of the integration capacitor Ca2; and the enable signal EN1 as the output of the flip-flop circuit RSFF1.

The output voltage VDC of the power factor improvement circuit PFC contains the so-called ripple voltage that fluctuates periodically as illustrated in FIG. 2. This ripple voltage fluctuates the power to be supplied to a load circuit such as the lamp. The ripple voltage can be reduced if a capacity of the smoothing capacitor Cs1 in the power factor improvement circuit PFC is increased. However, it is difficult to reduce the ripple voltage to zero in terms of the principle of the power factor improvement circuit.

Hence, it is conceived to stabilize the voltage by separately using a DC-DC converter. However, the DC-DC converter causes a power loss. Accordingly, in this embodiment, the inverter circuit performs control to correct an amount of the ripple voltage. Specifically, when the direct current voltage VDC as the output voltage of the power factor improvement circuit PFC is high, the inverter output is corrected so as to be reduced by the feedforward control circuit. Meanwhile, when the direct current voltage VDC is low, the inverter output is corrected so as to be increased.

In this embodiment, the increase and reduction of the light output is controlled by a lighting time.

When the ON pulse signal is outputted from the dimming signal generator DIM at a point of time t1, and the signal is inputted to the set signal of the flip-flop circuit RSFF1, the enable signal EN1 outputted from the non-inversion output Q of the flip-flop circuit RSFF1 becomes High. When the enable signal EN1 becomes High, the pulse width modulation controller PWM1 performs control to light the lamp.

Moreover, the inversion output Q' of the flip-flop circuit RSFF1 becomes Low. When the inversion output Q' becomes Low, the reset switch SW1 is turned off. When the reset switch SW1 is turned off, the integration operation for the capacitor Ca2 of the integration circuit is started. In the integration circuit, the direct current voltage VDC is integrated. In this integration operation, the capacitor Ca2 is charged slowly when the direct current voltage VDC is low, and is charged quickly when the direct current voltage VDC is high.

Thereafter, when the voltage Vint of the capacitor Ca2 becomes lower than the reference voltage Vref1 at a point of time t3, the output of the comparator CMP1 becomes High.

The output of the comparator CMP1 is inputted to the reset terminal of the flip-flop circuit RSFF1. Hence, when the output of the comparator CMP1 becomes High, the enable signal EN1 as the non-inversion output Q of the flip-flop circuit RSFF1 becomes Low. When the enable signal EN1 becomes Low, the pulse width modulation controller PWM1 performs control to shut off the lamp.

At a point of time t4, the OFF pulse signal is outputted from the dimming signal generator DIM, and is inputted to the reset terminal of the flip-flop circuit RSFF1.

At a point of time t5, the ON pulse signal is outputted from the dimming signal generator DIM, and is inputted to the set terminal of the flip-flop circuit RSFF1. The same operations are repeated on and after this point of time.

Figure 3:
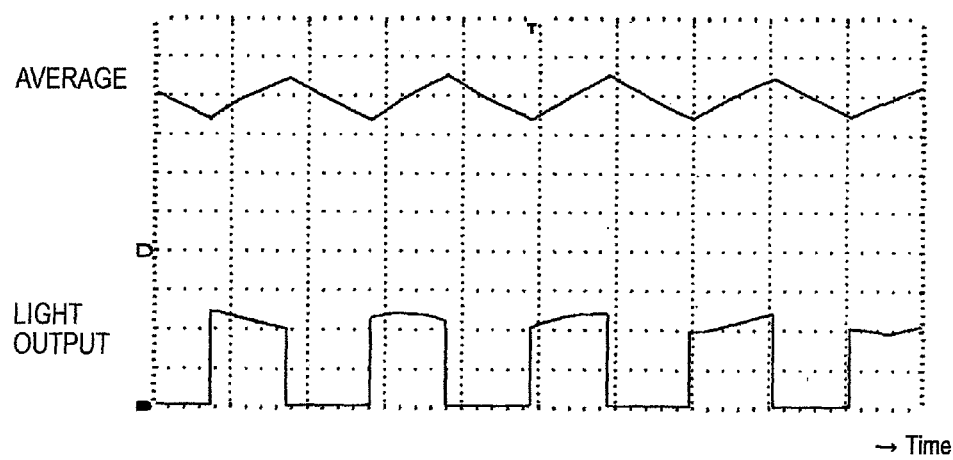
FIG. 3 is an operation explanatory chart of the first embodiment.

FIG. 3 is a graph showing an example of the operations of this embodiment. FIG. 3 shows a waveform of the light output when the lamp La1 is lighted in the blinking fashion by the direct current power containing the ripple voltage with 100 Hz, and shows a waveform obtained by averaging the waveform concerned. From the waveform of the light output, it is understood that the lighting and the shut off are repeated periodically, and that a peak value of the light output is changed by the ripple voltage. Meanwhile, when the averaged waveform of the light output is viewed, it is understood that a peak value thereof is uniform. Specifically, the control is performed, in which the lighting time is shortened when the direct current voltage is high, and the lighting time is lengthened when the direct current voltage is low. Accordingly, a light quantity per pulse light emission becomes constant. As a result, an average value of the light output can be made constant, thus making it possible to reduce the flickering.

Note that, in this embodiment, the time ratio between the lighting period and the shut-off period is controlled, whereby the light output is made constant. However, even if a time ratio between the lighting period and a dimming lighting period is controlled, similar effects can be obtained. Hence, even in the discharge lamp, if a discharge thereof is maintained in a dimming lighting state, it is possible to light the discharge lamp concerned like an LED and an EL.

A description is illustratively made of operations for the above by using the circuit shown in FIG. 1. During the lighting period, the switching elements Q1 and Q2 are alternately turned on/off at a first oscillation frequency (frequency relatively approximate to the resonant frequency). Meanwhile, during the dimming lighting period, the switching elements Q1 and Q2 are alternately turned on/off at an oscillation frequency (frequency that does not allow the shut off though is far from the resonant frequency) higher than the first oscillation frequency. Hence, the lighting period and the dimming lighting period are alternately switched, whereby bright and dark lighting is obtained. In this case, the lighting period and the dimming lighting period are repeated at the frequency (for example, 120 Hz) synchronized with the video update cycle of the liquid crystal display apparatus.

Moreover, in this embodiment, an average value of the shut-off time is larger than 0% of a blink cycle (for example, a time from t1 to t5 in FIG. 2). More preferably, the average value is 5% thereof or larger. In other words, the time ratio of the lighting period (ON state period) in the lighting circuit is smaller than 100% with respect to the sum of the lighting period concerned and the shut-off period (OFF state period), more preferably, is 95% or less. This is because it is frequent that the ripple voltage is approximately ±5% of the direct current voltage VDC, and such fluctuations can be corrected by increasing and reducing the lighting time by ±5%. Specifically, it is preferable that the reference voltage Vref1 be set within a range where the average value of the shut-off time becomes 5% or more of the blink cycle. In other words, it is preferable that the reference voltage Vref1 be set so that such a dimming range can become 0% to 95% of the blink cycle. Note that the most suitable time ratio is approximately 95%.

The present invention exerts the effects thereof when the lamp repeatedly blinks at the low frequency. A video update cycle of a general video display apparatus is 30 Hz or more, and the present invention is effective for blink lighting within a range approximately from 30 Hz concerned to 1 kHz.

For example, it is assumed that a ripple frequency is 100 Hz, and that a blink frequency is 120 Hz. In this case, light fluctuations of approximately 5% appear at a frequency difference of 20 Hz owing to interference between the ripple frequency and the blink frequency.

Here, when only the blink frequency is changed to 210 Hz, the frequency difference becomes 110 Hz equal to 210 Hz-100 Hz, and the flickering seems to disappear. However, in actual, the flickering does not disappear. In this case, the lamp blinks twice during a ripple cycle. A peak of a light output in this case fluctuates at the low frequency, and accordingly, light fluctuations appear, where a secondary flickering component becomes 10 Hz equal to 110 Hz-100 Hz. However, there is an effect of reducing the level of the light fluctuations from 5% to approximately 2 to 3%.

Specifically, if the blink frequency is raised, then a flickering feeling tends to be reduced in inverse proportion thereto. Hence, if the blink frequency is raised to approximately ten times the ripple frequency, the flickering feeling becomes approximately one-tenth. Accordingly, if the ripple voltage is approximately 5%, then the flickering concerned is reduced to an ignorable level. However, as mentioned above, as the blink frequency is raised, the light output is reduced, and the clear image is less likely to be obtained.

If the present invention is used, then it is possible to reduce the flickering even at the low blink frequency. As a matter of course, in the case where the lamp is lighted in the blinking fashion at the high frequency, the flickering can be further reduced.

Note that, in this embodiment, the lighting time is corrected by sensing the input voltage of the lighting circuit. However, the lighting time may be corrected by sensing an input voltage of the smoothing circuit in place of the input voltage of the lighting circuit. This is also applied to the following respective embodiments in a similar way.

Second Embodiment

Figure 4:
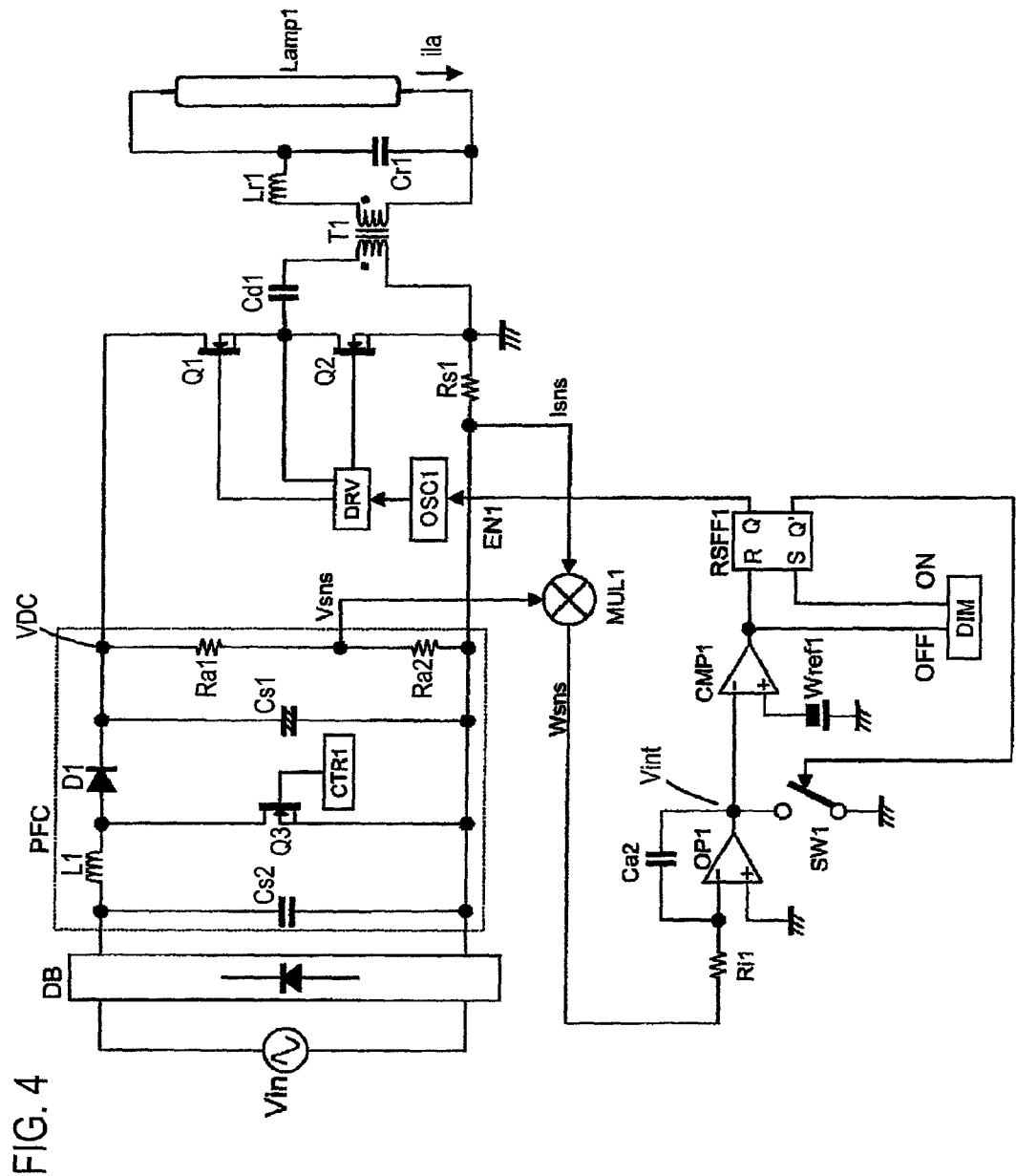
FIG. 4 is a circuit diagram of a second embodiment according to the present invention.

FIG. 4 shows a lighting circuit according to a second embodiment of the present invention. In this embodiment, the lighting time is determined based on an integration value of the input power. In the circuit of FIG. 4, the detection signal Vsns of the direct current voltage VDC and the detection signal Isns of the input current of the inverter circuit are inputted to a multiplier MUL1, and as a result, a power detection signal Wsns is outputted. This power detection signal Wsns is inputted to the integration circuit including the operational amplifier OP1 and the integration capacitor Ca2. When the integration value Vint becomes a reference value Wref1 or less, the comparator CMP1 outputs High, and the inverter circuit turns to a shut-off state.

A high frequency oscillator OSC1 oscillates a high frequency of which frequency becomes the operation frequency of the inverter circuit. This oscillation is controlled by the enable signal EN1, and the high frequency oscillator OSC1 oscillates when the enable signal EN1 is High, and stops oscillating when the enable signal EN1 is Low. Alternatively, the high frequency oscillator OSC1 oscillates at a first oscillation frequency (frequency relatively approximate to the resonant frequency) when the enable signal EN1 is High, and oscillates at a second oscillation frequency (frequency that does not allow the shut off though is far from the resonant frequency) higher than the first oscillation frequency when the enable signal EN1 is Low.

Other configurations and operations are similar to those of Embodiment 1.

In this embodiment, the lighting time is controlled for each lighting period so that the integration value of the input power of the inverter circuit can become a predetermined power amount, and accordingly, the light output per lighting period can be controlled to be constant. Hence, it is possible to reduce the flickering owing to the ripple voltage of the direct current voltage.

Third Embodiment

Figure 5:
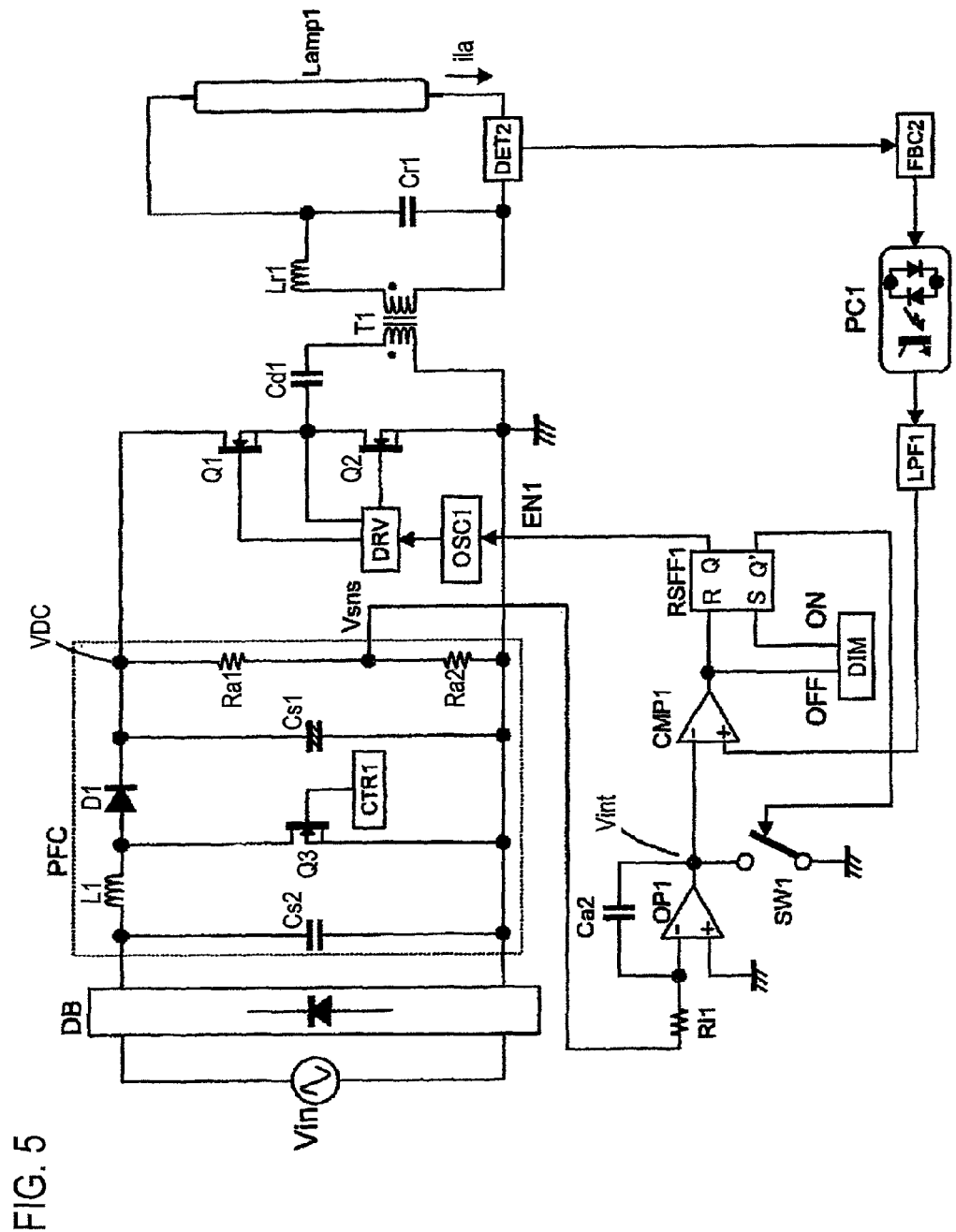
FIG. 5 is a circuit diagram of a third embodiment according to the present invention.

FIG. 5 shows a lighting circuit according to a third embodiment of the present invention. In this embodiment, a current detection circuit DET2 that detects a lamp current ila is inserted between one end of an inverter circuit output and the lamp Lamp1. In order that an output of the current detection circuit DET2 can become a predetermined value, a lamp current feedback circuit is provided, which is composed of: a feedback control circuit FBC2 that sets a reference voltage (corresponding to Vref1 in FIG. 1) of the feedforward control circuit; a photocoupler PC1 that transmits an output signal of the feedback control circuit FBC2 to the primary side; and a low-pass filter LPF1 that smoothes an output of the photocoupler PC1. Moreover, the inverter circuit includes the high frequency oscillator OSC1 described in the second embodiment. Other configurations are similar to those of the first embodiment.

In this embodiment, long-term load fluctuations, which are difficult to control by the feedforward control, are suppressed by the feedback control. The feedforward control exhibits a control response only to a certain determined input, and accordingly, it is difficult to perform sufficient control design against a variety of disturbances. Therefore, it is effective to use the feedback control in combination for factors of the load current fluctuations other than the power supply ripple.

The current detection circuit DET2 detects the lamp current ila. In order to make a detection signal concerned constant, the feedback control circuit FBC2 controls a positive input terminal voltage of the comparator CMP1, which is a target value of the feedforward control, through the photocoupler PC1 and the smoothing low-pass filter LPF1.

A response speed of this feedback control is set sufficiently slow so that the response cannot be made to the power supply frequency and the blink frequency. In the setting as described above, load current fluctuations owing to a change of the ambient temperature and an output change owing to long-term use can be accurately corrected and controlled.

In accordance with this embodiment, even for a long period, it is possible to stably reduce the flickering owing to the ripple voltage of the direct current voltage.

Fourth Embodiment

Figure 6:
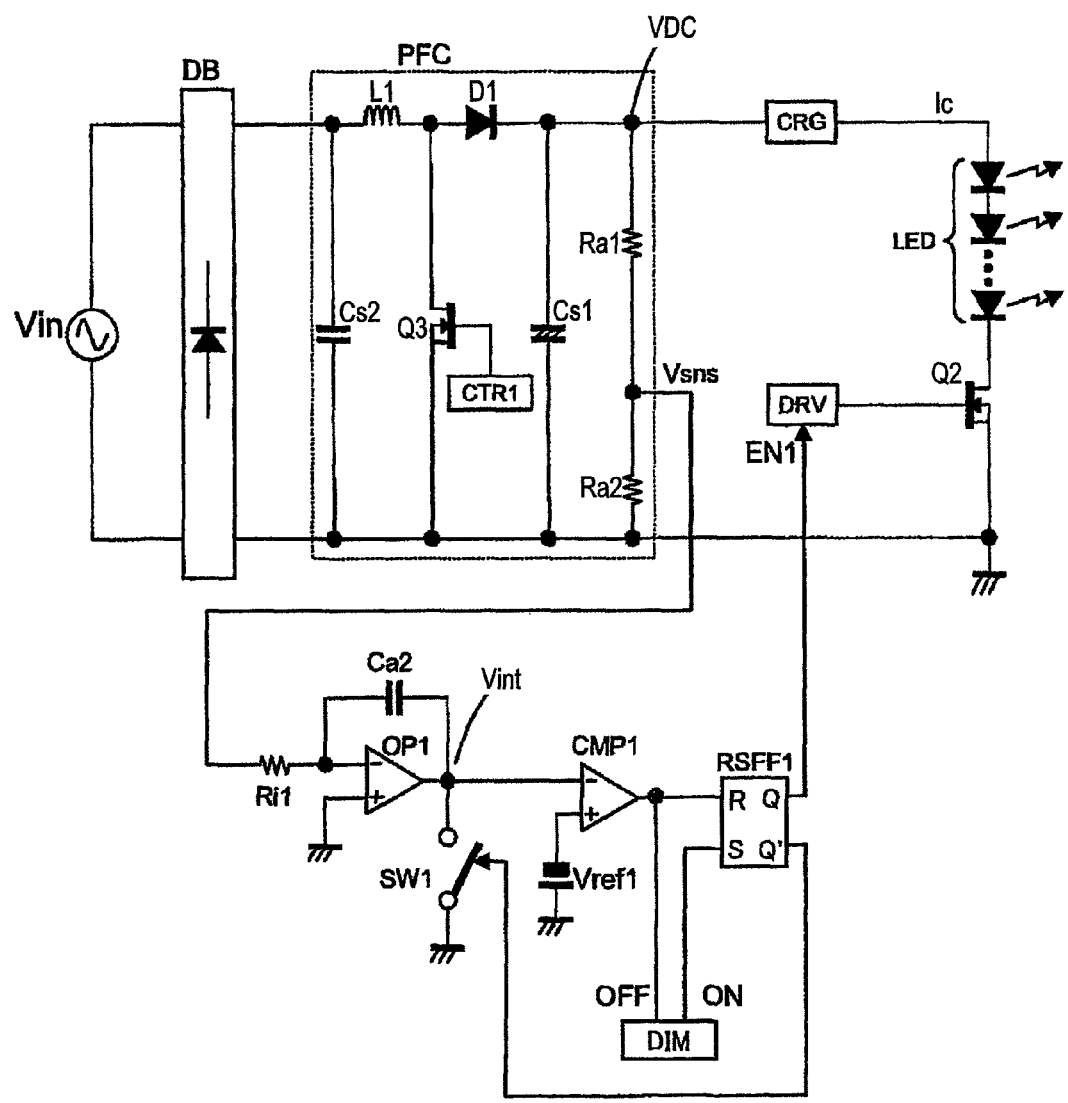
FIG. 6 is a circuit diagram of a fourth embodiment according to the present invention.

FIG. 6 shows a lighting circuit according to a fourth embodiment of the present invention. The lighting circuit in this embodiment is a circuit that lights LEDs. This lighting circuit includes the rectifier circuit DB and the power factor improvement circuit PFC. The output voltage VDC of the power factor improvement circuit PFC is supplied to an LED lighting circuit composed of: a plurality of the LEDs connected in series to a current restriction circuit CRG; and a switch Q2 connected in series thereto. The current restriction circuit CRG is a circuit that controls a current flowing through the LEDs to be stable, and for example, a resistor, a step-down chopper circuit, a constant current element or the like. The switch Q2 of the LED lighting circuit is turned on/off by the drive circuit DRV. When the enable signal EN1 is High, the switch Q2 is turned on, and when the enable signal EN1 is Low, the switch Q2 is turned off.

In a similar way to the other embodiments, also in this embodiment, the feedforward control circuit is provided, which is composed of: the resistors Ra1, Ra2 and Ri1; the integration capacitor Ca2; the reset switch SW1 for the integration capacitor; the operational amplifier OP1 and the comparator CMP1; and the reference voltage Vref1.

The reference voltage Vref1 is inputted to the positive input terminal of the comparator CMP1. The output of the comparator CMP1 is inputted to the reset input R of the flip-flop circuit RSFF1. To the set input S of the flip-flop circuit RSFF1, the ON pulse signal of the dimming signal generator DIM is inputted. The inversion output Q' of the flip-flop circuit RSFF1 is outputted to the reset switch SW1. The drive circuit DRV performs the lighting/shut-off control based on the enable signal EN1 as the non-inversion output Q of the flip-flop circuit RSFF1. The dimming signal generator DIM periodically outputs the ON pulse signal and the OFF pulse signal.

In this embodiment, the flickering owing to the ripple voltage is reduced when the LEDs is used as elements to be lighted by the direct current power. The LEDs are lighted by an output of a smoothing circuit, and accordingly, do not require a circuit that converts the direct current voltage into the high frequency voltage like the inverter circuit. However, as mentioned above, the flickering occurs at the low frequency when the LEDs are lighted in the blinking fashion.

In accordance with this embodiment, the feedforward control that controls the lighting time so that the lighting light quantity per number of times cannot be changed is performed, and accordingly, it is possible to reduce the flickering owing to the ripple voltage caused by the power supply. Moreover, since such a constant voltage converter circuit for removing the power supply ripple is not required, the loss of the lighting circuit can be reduced.

Fifth Embodiment

Figure 7:
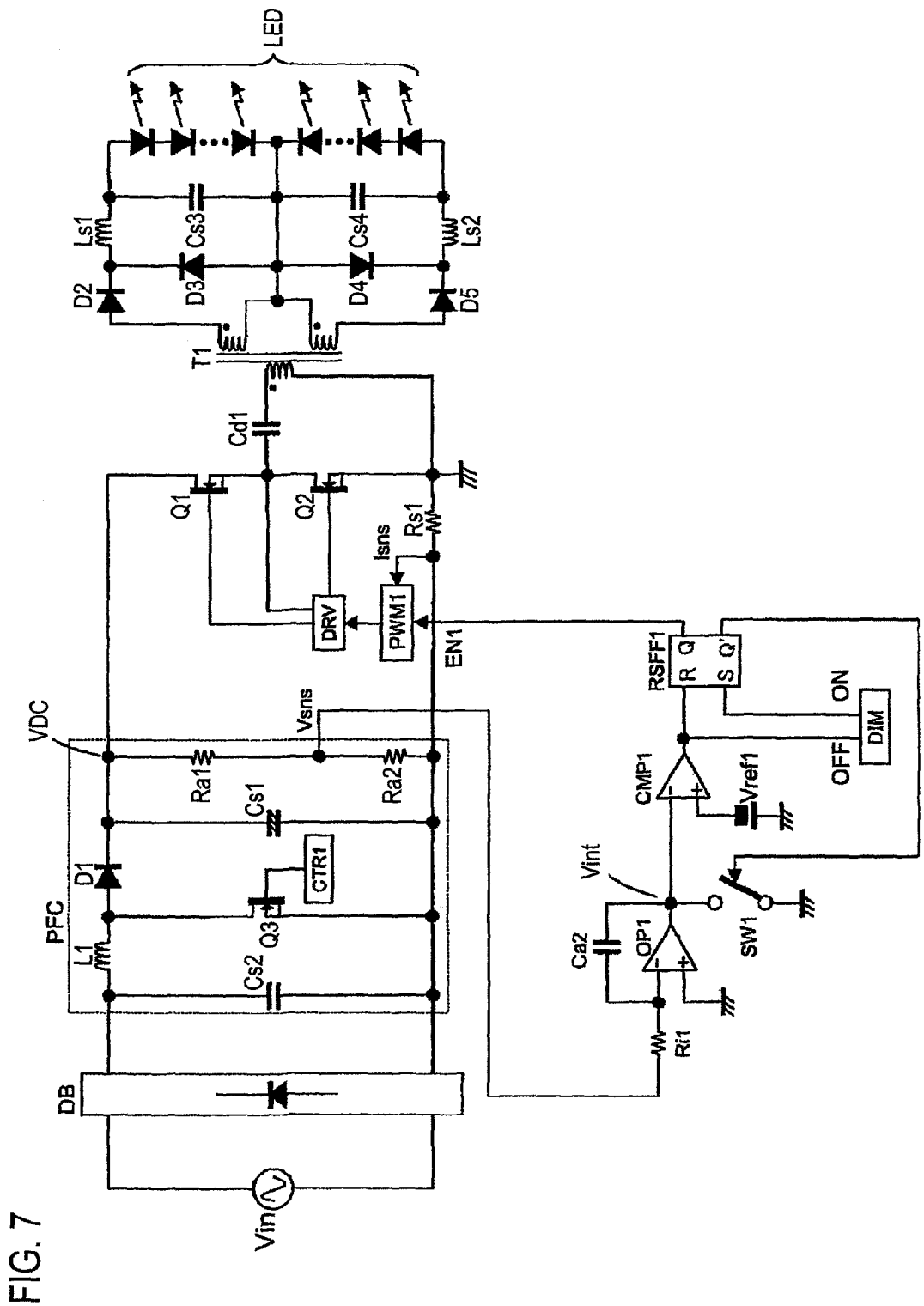
FIG. 7 is a circuit diagram of a fifth embodiment according to the present invention.

FIG. 7 shows a lighting circuit according to a fifth embodiment of the present invention. The lighting circuit in this embodiment is a circuit that lights the LEDs while isolating the power supply side and the load side from each other. This lighting circuit includes: the rectifier circuit DB that rectifies the commercial power; and the power factor improvement circuit PFC that steps up and smoothes the output of the rectifier circuit DB. The output voltage VDC of the power factor improvement circuit PFC is supplied to a half bridge circuit, which is composed of: the switching elements Q1 and Q2 and the drive circuit DRV therefor; the capacitor Cd1 and the isolation transformer T1; diodes D2 to D5 and smoothing capacitors Cs3 and Cs4; and smoothing inductors Ls1 and Ls2. The resistor Rs1 that detects the input current is inserted to a low voltage-side input terminal of the half bridge circuit. The direct current voltage VDC is converted into an isolated direct current voltage by the half bridge circuit, and power is supplied to the LEDs.

The half bridge circuit includes the pulse width modulation controller PWM1. The feedback control circuit is added to the half bridge circuit. In this feedback control, the detection signal from the resistor Rs1 is received, whereby the ON time and operation frequency of each of the switching elements Q1 and Q2 is adjusted so that the input current to the half bridge circuit can become a predetermined value.

In a similar way to the other embodiments, also in this embodiment, the feedforward control circuit is provided, which is composed of: the resistors Ra1, Ra2 and Ri1; the integration capacitor Ca2; the reset switch SW1 for the integration capacitor; the operational amplifier OP1 and the comparator CMP1; and the reference voltage Vref1.

The reference voltage Vref1 is inputted to the positive input terminal of the comparator CMP1. The output of the comparator CMP1 is inputted to the reset input R of the flip-flop circuit RSFF1. To the set input S of the flip-flop circuit RSFF1, the ON pulse signal of the dimming signal generator DIM is inputted. The inversion output Q' of the flip-flop circuit RSFF1 is outputted to the reset switch SW1. The half bridge circuit controls the lighting/shut-off for the LEDs based on the enable signal EN1 as the non-inversion output Q of the flip-flop circuit RSFF1. The dimming signal generator DIM periodically outputs the ON pulse signal and the OFF pulse signal.

This embodiment is an example of reducing the flickering owing to the ripple voltage while performing the electrical isolation between the power supply side and the load side in the case of using the LEDs as the lighting elements.

Sixth Embodiment

Figure 8:
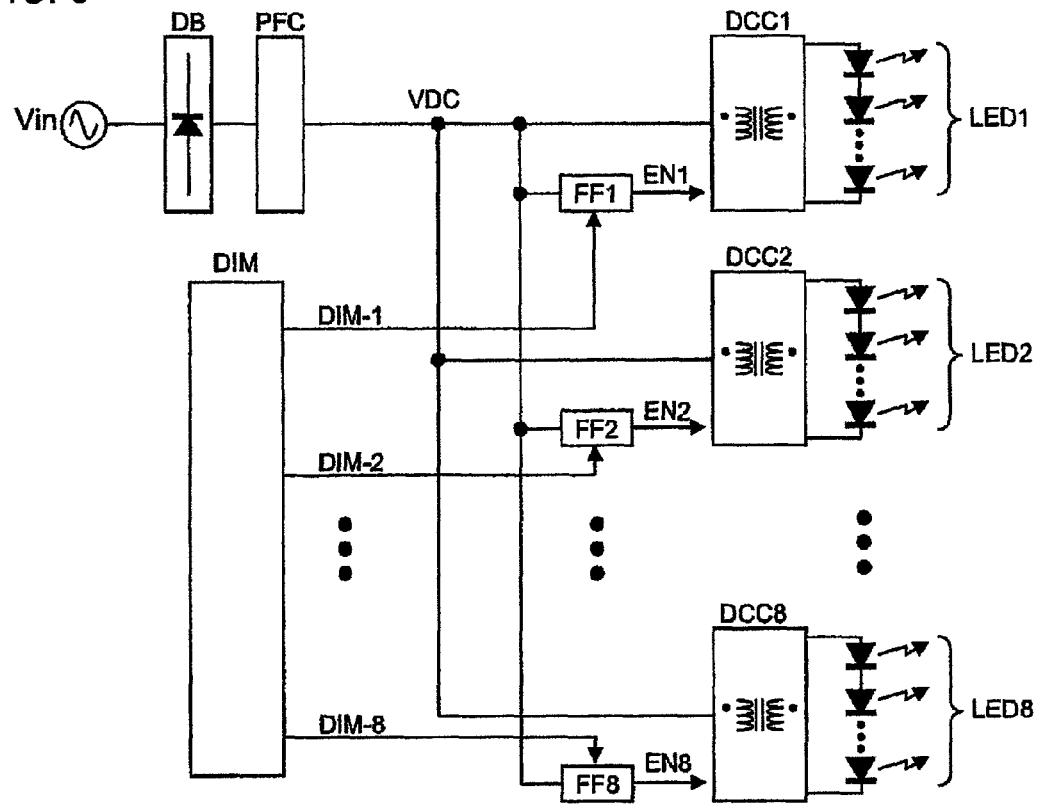
FIG. 8 is a circuit diagram of a sixth embodiment according to the present invention.

FIG. 8 shows a lighting circuit according to a sixth embodiment of the present invention. The lighting circuit in this embodiment is a circuit that sequentially lights the LEDs while dividing the LEDs into a plurality of groups. This lighting circuit includes: the rectifier circuit DB that rectifies the commercial power Vin; and the power factor improvement circuit PFC that steps up and smoothes the output of the rectifier circuit DB. The output voltage VDC of the power factor improvement circuit PFC is supplied to isolation converters DCC1 to DCC8. LED1 to LED8 are connected to the isolation converters DCC1 to DCC8, respectively.

This lighting circuit includes feedforward control circuits FF1 to FF8. The dimming signal generator DIM generates a plurality of ON/OFF timing signals DIM-1 to DIM-8.

Feedforward control circuits FF1 to FF8 output enable signals EN1 to EN8, each of which determines a lighting time of each of the LEDs, to the isolation converters DCC1 to DCC8 while taking, as references, the timing signals DIM-1 to DIM-8 of the dimming signal generator DIM. The isolation converters DCC1 to DCC8 repeatedly allow the lighting/shut off in response to the enable signals EN1 to EN8.

Figure 9:
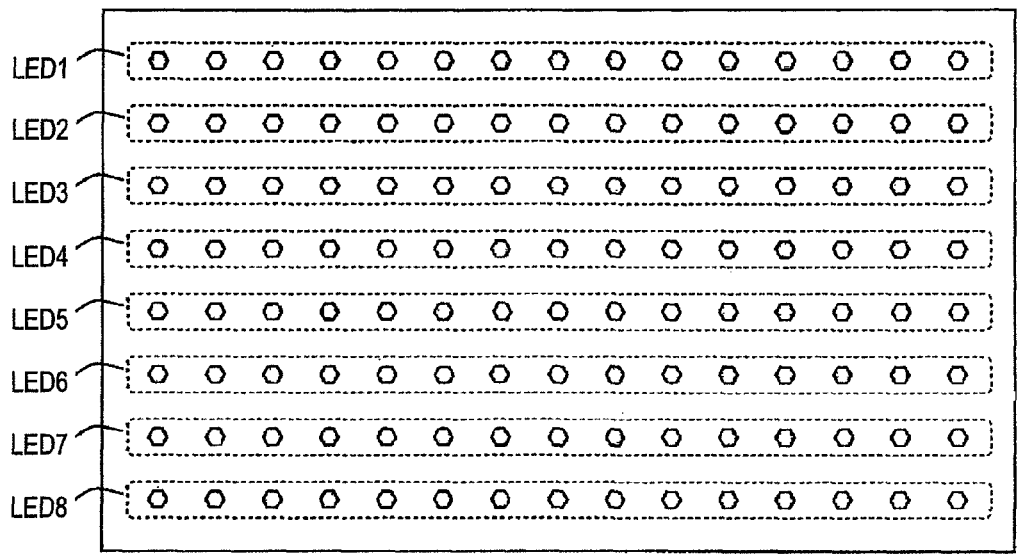
FIG. 9 is a front view showing arrangement of light sources of the sixth embodiment.

FIG. 9 shows an arrangement example of the respective LEDs. As in FIG. 9, the LED1 to LED8 are grouped for each row, and are subjected to the lighting control.

Figure 10:
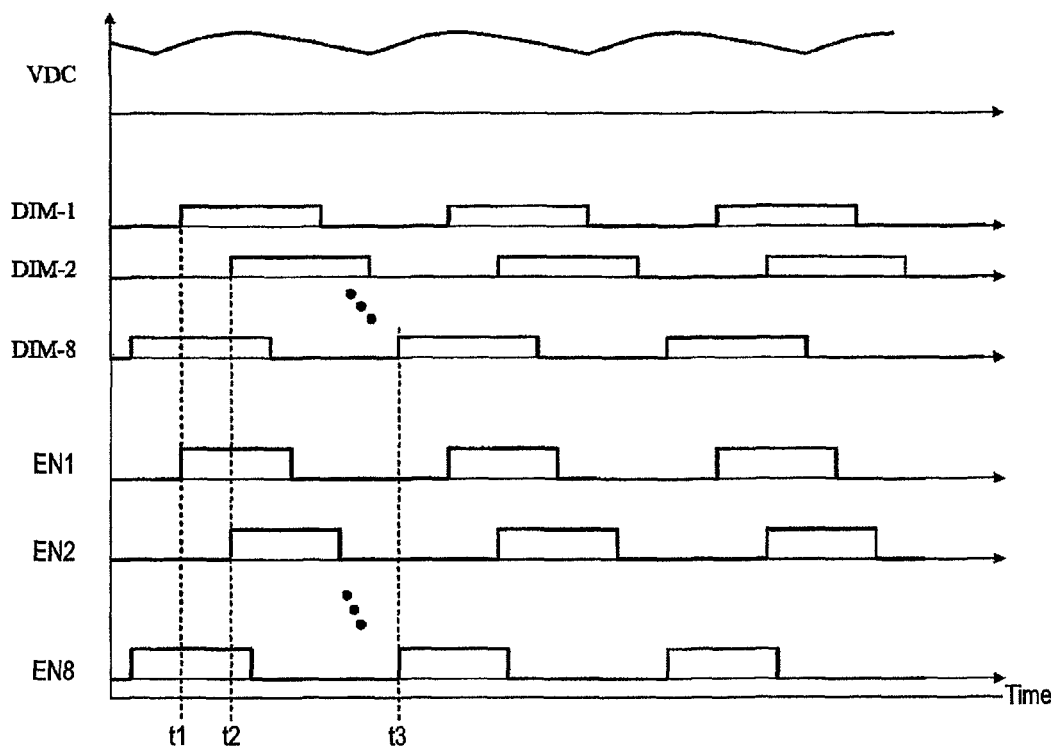
FIG. 10 is an operation waveform chart of the sixth embodiment.

FIG. 10 shows operation timing of each of signals. FIG. 10 shows the output voltage VDC of the power factor improvement circuit PFC, the outputs DIM-1, DIM-2 and DIM-8 of the dimming signal generator DIM, and the enable signals EN1, EN2 and EN8 of the feedforward control circuit.

As shown in FIG. 10, the dimming signal generator DIM outputs timing signals for starting to light the LEDs sequentially from the LED1 and periodically lighting the LEDs in the blinking fashion. Each of the feedforward control circuits FF1 to FF8 decides a lighting time corresponding to the input of the direct current voltage VDC while taking, as a reference, each of the timing signals DIM-1 to DIM-8 concerned. Then, the feedforward control circuits FF1 to FF8 output the enable signals EN1 to EN8 to the respective isolation converters DCC1 to DCC8.

Sequentially lighting of the LEDs as described above can enhance image quality of moving pictures displayed by the liquid crystal display apparatus. Moreover, the flickering owing to the ripple voltage superimposed on the direct current power can be reduced. Furthermore, since the converter for stabilizing the direct current voltage VDC is not required, the power can be supplied to the LEDs highly efficiently.

Seventh Embodiment

Figure 11:
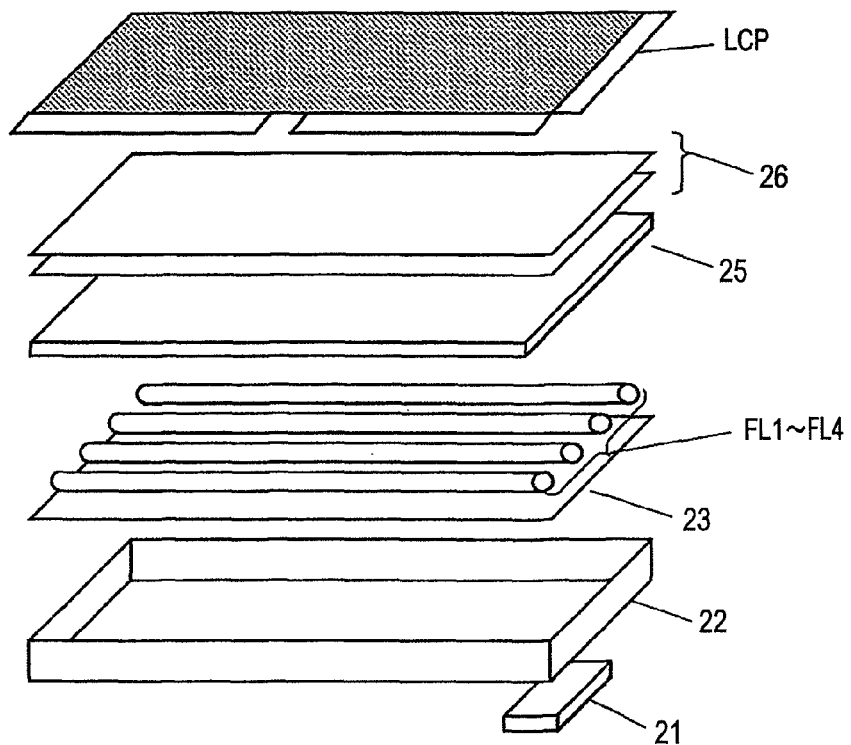
FIG. 11 is an exploded perspective view showing a schematic configuration of a liquid crystal display apparatus of a seventh embodiment according to the present invention.

FIG. 11 is an exploded perspective view of a liquid crystal display apparatus using the lighting apparatus according to each of the first to third embodiments. A backlight is arranged on a back surface (immediately under) of a liquid crystal panel LCP, and the backlight is composed of: a cabinet 22; a reflection plate 23 and a plurality of fluorescent lamps FL1 to FL4, which are arranged on the cabinet 22; and a diffusion plate 25 and an optical sheet 26 such as a prism sheet, which are installed above the reflection plate 23 and the fluorescent lamps FL1 to FL4. Moreover, on a back surface of the cabinet 22, a board 21 of the inverter that lights the fluorescent lamps FL1 to FL4 is installed. The reflection plate 23 directs irradiation light of each of the fluorescent lamps FL1 to FL4 effectively to the front. The diffusion plate 25 has a function to average a brightness distribution of illumination light to the front by diffusing the light from the fluorescent lamps FL1 to FL4 and the reflection plate 23.

The invention claimed is:
1. A lighting apparatus, comprising:
a rectifier configured to rectify a commercial power;
at least one smoothing circuit configured to smooth an output of the rectifier;
a lighting circuit configured to receive an output of the smoothing circuit and configured to supply power to a light source;
a dimming signal circuit configured to send a timing signal to the lighting circuit, the timing signal being for switching an output of the lighting circuit periodically to an ON state and either of an OFF state and a dimmed state, the ON state being a lighting period of the light source, the OFF state being a shut-off period thereof, and the dimmed state being a dimming period thereof; and
a feedforward control circuit configured to detect either of an input voltage of the lighting circuit and an input voltage of the smoothing circuit, and configured to send a control signal to the dimming signal circuit, the control signal being for correcting a period of the ON state based on the detected input voltage so that an average of a light output of the light source in a period during the ON state and the OFF state are alternately switched, or in a period during the ON state and the dimmed state are alternately switched, can become a desired value;

wherein the dimming signal circuit sets the period of the ON state of the lighting circuit to a period having a time ratio of 95% or less with respect to the sum of the period of the ON state and the period of the OFF state.

2. The lighting apparatus according to claim 1,
wherein the lighting circuit includes a control circuit that makes an input current inputted thereto constant.

3. The lighting apparatus according to claim 2,
wherein the feedforward control circuit starts to integrate a voltage signal proportional to either of the input voltage of the lighting circuit and an input voltage of the smoothing circuit simultaneously when the output of the lighting circuit is turned on, and when an integration value of the voltage signal becomes a predetermined value, sends a signal for turning off the lighting circuit to the dimming signal circuit.

4. The lighting apparatus according to claim 3,
wherein a frequency of the dimming signal circuit is 30 Hz to 1000 Hz.

5. A backlight apparatus comprising:
the lighting apparatus according to claim 4.

6. A backlight apparatus comprising:
the lighting apparatus according to claim 3.

7. A backlight apparatus comprising:
the lighting apparatus according to claim 2.

8. The lighting apparatus according to claim 1,
wherein the feedforward control circuit starts to integrate a multiplied value of an input voltage signal and input current signal of the lighting circuit simultaneously when the output of the lighting circuit is turned on, and when a value obtained by integrating the multiplied value becomes a predetermined value, sends a signal for turning off the lighting circuit to the dimming signal circuit.

9. A backlight apparatus comprising:
the lighting apparatus according to claim 8.

10. The lighting apparatus according to claim 1,
wherein the light source is a semiconductor light source.

11. A backlight apparatus comprising:
the lighting apparatus according to claim 1.

* * * * *